United States Patent
Wan et al.

(10) Patent No.: US 9,699,405 B2
(45) Date of Patent: Jul. 4, 2017

(54) IMMERSIVE TELECONFERENCING WITH TRANSLUCENT VIDEO STREAM

(71) Applicant: GOOGLE INC., Mountain View, CA (US)

(72) Inventors: Chung Chun Wan, Fremont, CA (US); Choon Ping Chng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 14/798,766

(22) Filed: Jul. 14, 2015

(65) Prior Publication Data

US 2017/0019627 A1    Jan. 19, 2017

(51) Int. Cl.
*H04N 7/14* (2006.01)
*H04N 7/15* (2006.01)
(Continued)

(52) U.S. Cl.
CPC ............ *H04N 7/144* (2013.01); *G06T 7/285* (2017.01); *G06T 7/292* (2017.01); *H04N 5/2226* (2013.01); *H04N 7/152* (2013.01); *H04N 9/3188* (2013.01); *G06T 7/194* (2017.01); *G06T 2200/28* (2013.01); *G06T 2207/10016* (2013.01);
(Continued)

(58) Field of Classification Search
CPC .. H04N 5/2226; H04N 9/3188; G06T 7/2086; G06T 7/2093; G06T 2200/28; G06T 2207/10016; G06T 2207/20144; G06T 2207/30196; G06T 2207/30232; G06T 2210/62; G06T 7/194; G06T 7/285; G06T 7/292

USPC ............... 348/14.01–14.16; 370/259–271, 370/351–357; 379/201.01, 202.01; 709/201–207, 217–248
See application file for complete search history.

(56) References Cited

U.S. PATENT DOCUMENTS 4,928,301 A    5/1990    Smoot
5,038,224 A    8/1991    Martulli et al.
(Continued)

OTHER PUBLICATIONS

International Search Report and Written Opinion from PCT/US2016/39537, mailed Sep. 9, 2016, 9 pages.

*Primary Examiner* — Hemant Patel
(74) *Attorney, Agent, or Firm* — Brake Hughes Bellermann LLP

(57) ABSTRACT

An immersive video teleconferencing system may include a transparent display and at least one image sensor operably coupled to the transparent display. The at least one image sensor may be multiple cameras included on a rear side of the transparent display, or a depth camera operably coupled to the transparent display. Depth data may be extracted from the images collected by the at least one image sensor, and an image of a predetermined subject may be segmented from a background of the collected images based on the depth data. The image of the segmented predetermined subject may also be scaled based on the depth data. The image of the scaled segmented predetermined subject may be transmitted to a remote transparent display at a remote location, and displayed on the remote transparent display such that a background surrounding the displayed image of the remote location is visible through the transparent display, so that the predetermined subject appears to be physically located at the remote location.

17 Claims, 11 Drawing Sheets

(51) Int. Cl.
*H04N 5/222* (2006.01)
*H04N 9/31* (2006.01)
*G06T 7/285* (2017.01)
*G06T 7/292* (2017.01)
*G06T 7/194* (2017.01)

(52) U.S. Cl.
CPC ........... *G06T 2207/30196* (2013.01); *G06T 2207/30232* (2013.01); *G06T 2210/62* (2013.01)

(56) References Cited

U.S. PATENT DOCUMENTS

| | | | |
|---|---|---|---|
| 5,159,445 A | 10/1992 | Gitlin et al. | |
| 7,714,923 B2* | 5/2010 | Cok | H04N 7/144 345/175 |
| 8,446,459 B2* | 5/2013 | Fang | H04N 7/15 348/43 |
| 9,007,427 B2* | 4/2015 | Hoover | H04N 7/157 348/14.07 |
| 9,057,931 B1* | 6/2015 | Baldwin | G02F 1/00 |
| 2004/0165060 A1 | 8/2004 | McNelley et al. | |
| 2004/0212555 A1* | 10/2004 | Falco | G06F 1/1626 345/50 |
| 2007/0002130 A1* | 1/2007 | Hartkop | H04N 7/141 348/14.16 |
| 2008/0013050 A1 | 1/2008 | Boute et al. | |
| 2008/0106629 A1 | 5/2008 | Kurtz et al. | |
| 2010/0188478 A1 | 7/2010 | Robinson et al. | |
| 2011/0134205 A1 | 6/2011 | Arney et al. | |
| 2011/0279689 A1* | 11/2011 | Maglaque | H04N 5/2253 348/207.1 |
| 2012/0113210 A1* | 5/2012 | Kim | H04N 7/147 348/14.04 |
| 2013/0127976 A1* | 5/2013 | Nagano | H04N 5/225 348/14.01 |
| 2014/0347436 A1* | 11/2014 | DeMerchant | H04N 7/142 348/14.08 |

* cited by examiner

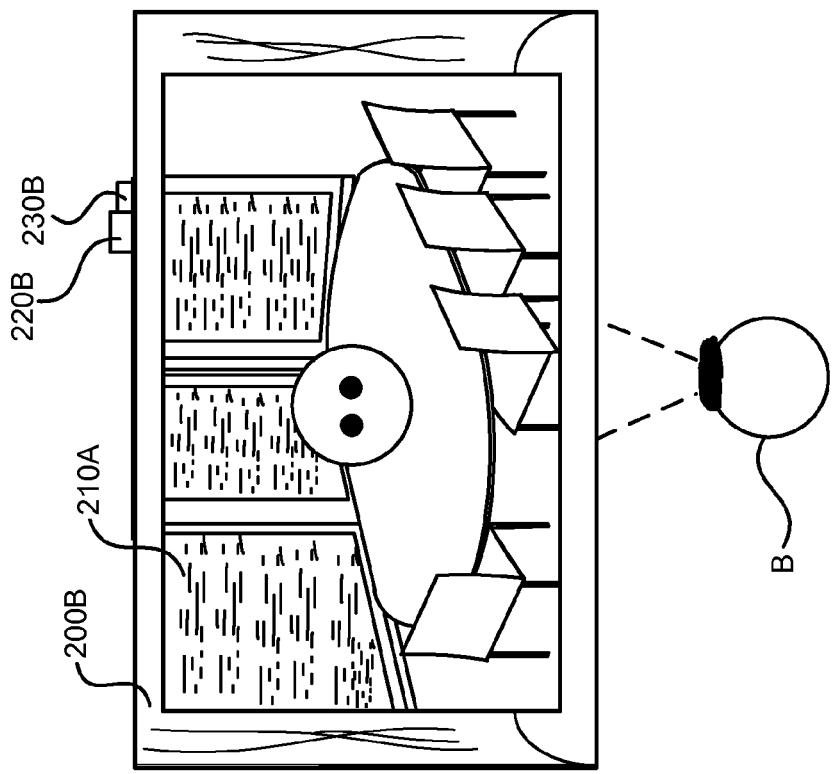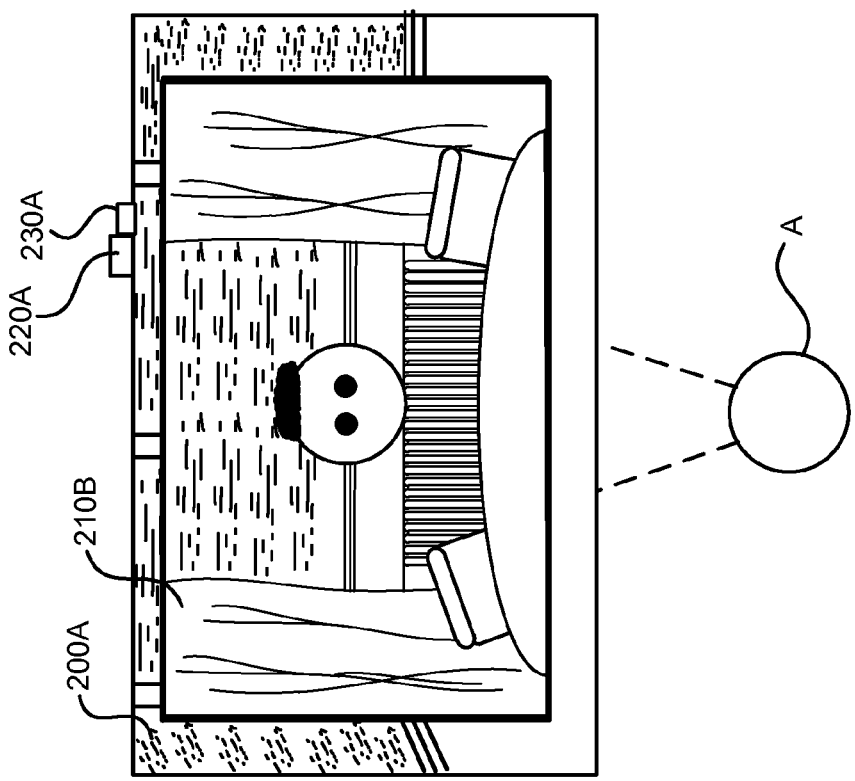
FIG.2

IMMERSIVE TELECONFERENCING WITH TRANSLUCENT VIDEO STREAM

FIELD

This document relates, generally, to teleconferencing, and in particular, to generating an immersive teleconferencing experience.

BACKGROUND

Teleconferencing may allow for a meeting including two or more participants, the two or more participants being remote from each other. A teleconference may involve more than a simple two-way telephone connection. For example, a teleconference may be a relatively simple audio conference in which one or both ends of the conference share a speaker phone with multiple participants. With the addition of video equipment, a teleconference, or in this instance, a video teleconference, may allow participants to view still and/or moving images of each other while also transmitting and receiving audio information amongst the participants.

SUMMARY

In one aspect, a method may include connecting a first video teleconferencing device at a first location to a second video teleconferencing device at a second location to initiate a video teleconferencing session, the second location being different from the first location, synchronizing operation of a first transparent display at the first location and at least one first image sensor at the first location, the at least one first image sensor being operably coupled to the first transparent display, collecting images at the first location using the at least one first image sensor, processing the images collected at the first location by the at least one first image sensor to extract a scaled image of a predetermined subject at the first location, transmitting the extracted scaled image of the predetermined subject at the first location to the second video teleconferencing device at the second location, and displaying the extracted scaled image of the predetermined subject on a second transparent display of the second video teleconferencing system at the second location.

In another aspect, a method may include synchronizing operation of a first transparent display at a first location and at least one first image sensor at the first location, the at least one first image sensor being operably coupled to the first transparent display, collecting images at the first location using the at least one first image sensor, the collected images including a predetermined subject located at the first location, extracting depth data from the images collected by the at least one first image sensor, segmenting an image of the predetermined subject from a background of the images collected by the at least one first image sensor based on the depth data, scaling the segmented image of the predetermined subject based on the depth data, transmitting the segmented scaled image of the predetermined subject at the first location to a second transparent display at a second location, and displaying the segmented scaled image of the predetermined subject located at the first location on the second transparent display at the second location.

In another aspect, an immersive video teleconferencing apparatus may include a transparent display, at least one image sensor, and a controller operably coupling the at least one image sensor to the transparent display. The controller may receive images collected by the at least one image sensor, extract depth data from the images collected by the at least one image sensor, segment a predetermined subject from a background of the collected images based on the depth data, scale the image of the segmented predetermined subject based on the depth data, and transmit the image of the scaled segmented predetermined subject to a remote transparent display.

The details of one or more implementations are set forth in the accompanying drawings and the description below. Other features will be apparent from the description and drawings, and from the claims.

BRIEF DESCRIPTION OF THE DRAWINGS

FIG. 2 illustrates an example of a video teleconference in progress.

DETAILED DESCRIPTION

Teleconferencing may provide for the real time exchange of information amongst multiple remotely located participants, linked together by a telecommunications system. Teleconferencing may allow for essentially real time exchange of audio information and/or video information and/or other the sharing of other digital data such as, for example, collaboration on working documents and the like. A fully immersive teleconferencing environment, in which a first participant at a first location may appear, to a second participant at a second location, to be actually at the second location, may provide a more immersive and realistic conferencing experience.

Figure 1:
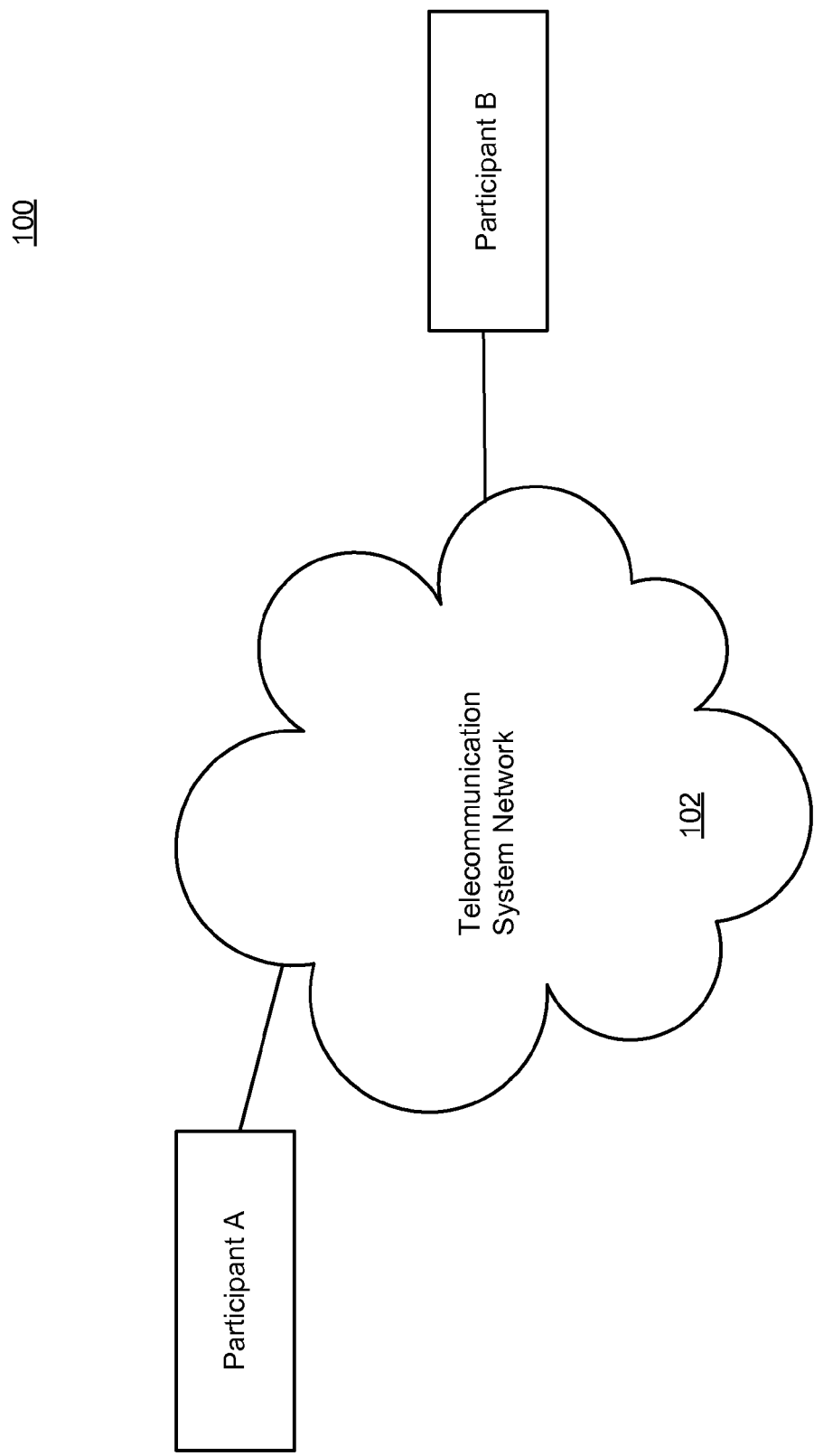
FIG. 1 illustrates an example implementation of a teleconferencing system.

An example implementation of a teleconferencing system is shown in FIG. 1. In this example implementation, a first participant A and a second participant B may communicate with each other via a telecommunications system network 102. The telecommunication system network 102 may allow participant A and participant B to exchange audio information and/or video information, as well as other digital data information in support of, for example, document sharing and collaboration and the like. In the example implementation illustrated in FIG. 1, two participants A and B are involved in the audio/video teleconference, simply for ease of discussion and illustration, and the audio/video teleconference may include other participants, in addition to participants A and B shown in FIG. 1.

In the example implementation shown in FIG. 2, participant A is at location A, and is viewing a display screen 200A also located at location A. Participant B is at location B, remote from location A, and is viewing a display screen 200B also located at location B, with an image 210B of participant B superimposed on the display screen 200A at location A for viewing by participant A, and an image 201A of participant A superimposed on the display screen 200B at location B for viewing by participant B. In this example implementation, participant A and participant B are involved in a video teleconference, with image data captured by a camera 220A and audio data captured by a microphone 230A at location A, and image data captured by a camera 220B and audio data captured by a microphone 230B at location B.

The example implementation shown in FIG. 2 may provide for effective exchange of audio and video data between participant A and participant B. However, the image 210B of participant B displayed on the display screen 200A at location A includes some of the area surrounding participant B at location B captured by the camera 220B at location B. Similarly, the image 210A of participant A displayed on the display screen 200B at location B includes some of the area surrounding participant A at location A captured by the camera 220A at location A. Thus, in the image 210B superimposed on the display screen 200A and viewed by participant A, it does not appear as though participant B is co-located with participant A, as the surroundings, or background, of the image 210B do not match the surroundings at location A. Similarly, in the image 210A superimposed on the display screen 200B and viewed by participant B, it does not appear as though participant A is co-located with participant B, as the surroundings, or background, in the image 210A do not match the surroundings at location B. The differences between the remote image displayed on the display screen and the surroundings at the local user's location keep the local user from feeling as though the remote user is physically there, and keep the video teleconference from being a fully immersive experience. Additionally, depending on various factors, such as, for example, a distance between the user and the camera capturing the user's image, the remote user may appear out of proportion with the local user's surroundings when viewed on the local user's display screen.

In an immersive teleconferencing system, in accordance with embodiments as broadly described herein, one, or multiple, image sensors, such as, for example, cameras may capture images including a first user and the first user's surroundings at a first location, and may segment an image of the first user from the first user's surroundings for display on a transparent display of a second user. By displaying the segmented image of the first user on the transparent display of the second user, it may appear to the second user as though the first user is physically present at the second location. By capturing the images of the first user with multiple cameras, and/or a depth camera, and generating a depth map, a scaled image of the first user may be displayed on the second user's transparent display, so that the first user may be displayed at an appropriate size and scale.

The transparent display, or see through display, may allow the second user to view images displayed on the display, such as, for example, an image of the first user, while still being able to see through the display. A transparent display may include, for example, an organic light emitting diode (OLED) panel which makes use of emissive electroluminescent layers that emit light in response to application of an electric current, thus eliminating the need for illumination by a backlight which would otherwise block visibility through the panel. In some instances, a transparent display may include, for example, a liquid crystal display (LCD) panel which makes use of natural light for display illumination, rather than illumination by a backlight which would otherwise block visibility through the panel. In some instances, a transparent display may include, for example, a plurality of nanoparticles embedded in a transparent material, and tuned to scatter only certain wavelengths, while allowing remaining wavelengths to pass through. Any of these transparent displays may allow digital images to be overlaid onto real world images visible through the display.

Figure 3A:
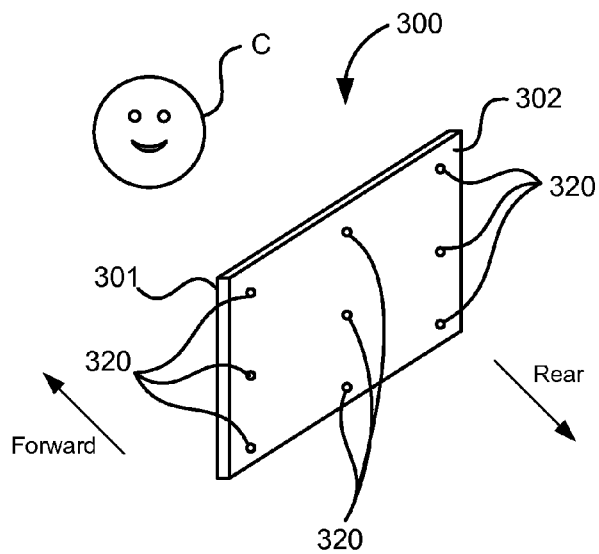
FIGS. 3A-3C are rear perspective views of example transparent displays and image sensors of an immersive video teleconferencing system.
Figure 3B:
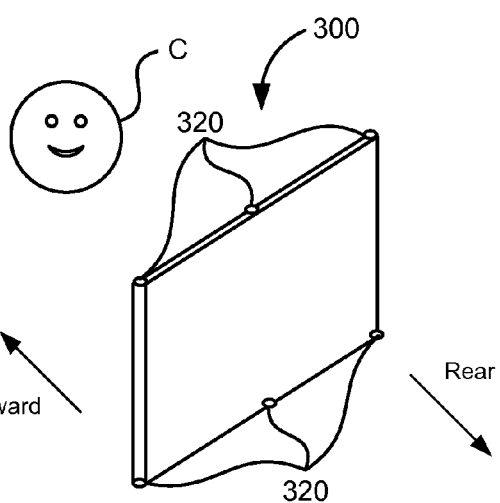
Figure 3C:
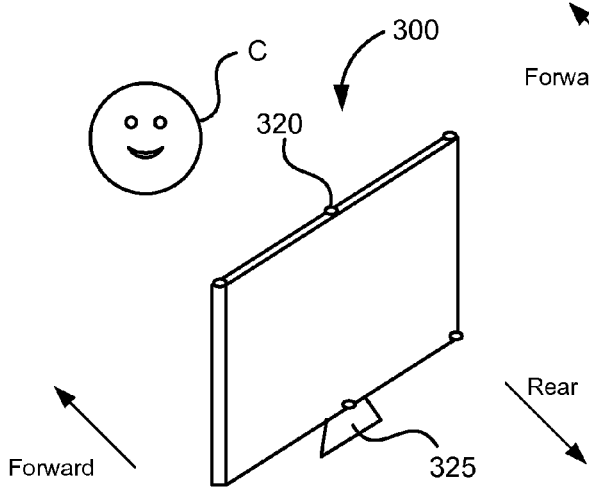

FIGS. 3A-3C are rear perspective views of example displays and corresponding image sensors which may be included in an immersive teleconferencing system, in accordance with embodiments as broadly described herein. A single display and corresponding image sensors is shown in each of FIGS. 3A-3C, simply for ease of discussion and illustration. Each of the multiple users of the immersive teleconferencing systems may make use of a similar display and corresponding image sensors.

The display 300 shown in each of FIGS. 3A-3C may be a transparent display, so that an area at a rear of the display 300 may be viewed by the local user C, positioned in an area forward of the display 300, through the transparent display 300. That is, a local user C positioned at the forward side of the transparent display 300 may view an area at the rear side of the transparent display 300 through the transparent display 300. A plurality of image sensors 320, such as, for example, cameras, may be operably coupled to the transparent display 300 to capture images of the local user C. In some embodiments, at least one, or more, of the plurality of image sensors 320 may be, for example, global shutter cameras. In some embodiments, at least one, or more, of the plurality of cameras may include an automatic focus feature that adjusts a focus of the camera to adapt to movement of the subject.

In some embodiments, the plurality of cameras 320 may be coupled to the transparent display 300 at a rear surface 302 of the transparent display 300, as shown in FIG. 3A. In this arrangement, each of the cameras 320 may be coupled to the transparent display so that lenses of the cameras 320 are oriented to capture a corresponding image of the local user C and/or the area surrounding the local user C through the transparent display 300. The example implementation illustrated in FIG. 3A includes nine image sensors 320 coupled to the rear surface 302 of the transparent display 302. However, more, or fewer, image sensors 320 may be included based on a particular implementation, and a physical arrangement of the image sensors 320 may be adjusted based on a particular implementation.

In some embodiments, the plurality of image sensors 320 may be coupled to a periphery of the transparent display 320, as shown in FIG. 3B. In this arrangement, the image sensors 320 may be coupled to the transparent display 300 so that lenses of the image sensors 320 are oriented to capture a corresponding image of the local user C and/or the area surrounding the local user C. The example implementation illustrated in FIG. 3B includes six image sensors 320 coupled to the periphery of the transparent display 300. However, more, or fewer, image sensors 320 may be included based on a particular implementation, and a physical arrangement of the image sensors 320 may be adjusted based on a particular implementation.

In some embodiments, a depth sensor 325, for example a depth sensor included on a depth camera, may be operably coupled to the transparent display 300, in addition to, or instead of, for example, a single, or multiple, image sensors 320, as shown in FIG. 3C. In this arrangement, the depth sensor 325 may develop a depth map including the local user C and the local area surrounding the local user C. In some embodiments, the image sensors 320 may also capture images of the local user C and the local area surrounding the local user C.

Images, for example, moving images, captured by the multiple image sensors 320 shown in FIGS. 3A and 3B, or by the depth sensor 325 shown in FIG. 3C, may be used to develop a depth map including the local user C and local area surrounding the local user C. The depth data may be used to segment the local user C from the local background. The depth data may also be used to calculate an actual size of the local user C, so that the image of the local user C to be displayed on the display screen of the remote user may be displayed accordingly.

Figure 3D:
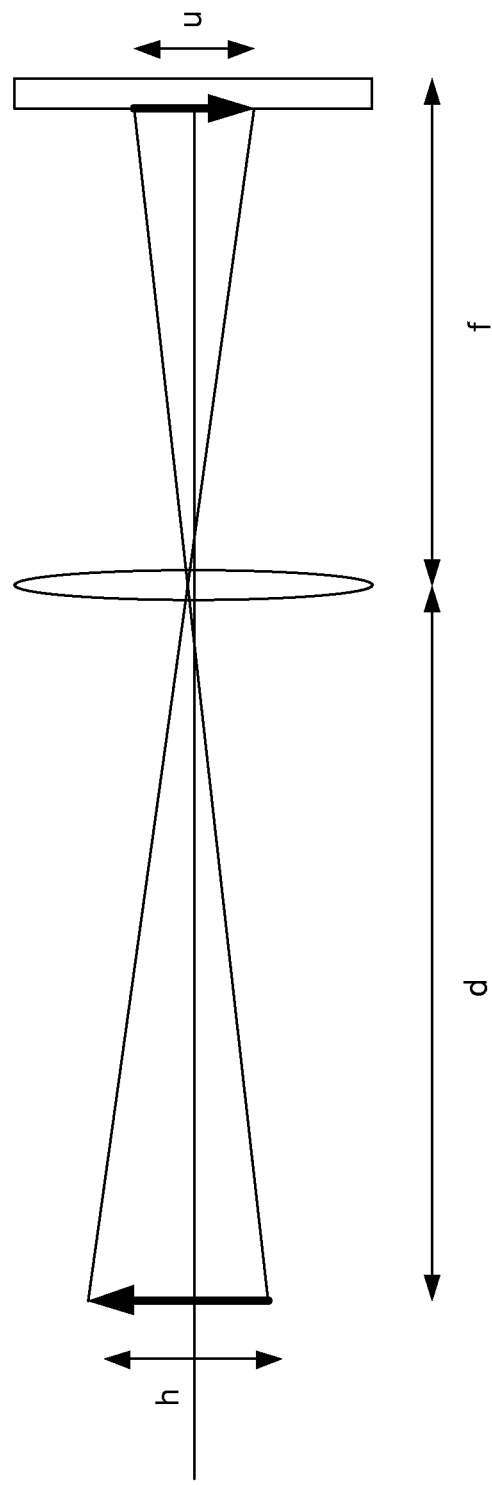
FIG. 3D is a diagram illustrating the determination of a size of a subject captured by the image sensors shown in FIGS. 3A-3C, in accordance with embodiments as broadly described herein.

An example of this is shown in FIG. 3D. As discussed above with respect to, for example, FIG. 3A, image sensors may be located on the rear surface of the transparent display, the image sensors having a known focal length f. The field of view of each image sensor may be oriented in a direction forward of the transparent display, toward an object (such as, for example, the local user C) having an actual size h, with a size u of the image of the object captured by the image sensor corresponding to the actual size h of the object. For example, with the image of the local user C having been captured, and the image of the local user C segmented from the background, the size h of the local user C may map to a size u on the plane of the image sensor. The detected image size u on the plane of the image sensor may correspond to some number N of image sensor pixels, each image sensor pixel having a size of xi. Using this information, the size u of the image on the plane of the image sensor may be determined by equation 1.i $$u = N * xi \quad \text{[Equation 1]}$$

Using the depth data extracted as described above from the data captured by the plurality of image sensors and/or the depth camera, the size h of the local user C, or other object, may be determined using equation 2.

$$h = \left(\frac{N * xi}{f}\right) * d \text{ or } h = \left(\frac{u}{f}\right) * d \quad \text{[Equation 2]}$$

The calculated actual size h of the local user C may be scaled for display on the transparent display of the remote user. The display of the remote user may have a different display pixel size xd than the display pixel size xi of the display of the local user C. The image may be scaled so that the correct number of display pixels are occupied by the image on the display of the remote user, to display the image at the actual size h, using equation 3.

$$\left(\frac{h}{xd}\right) = \left(\frac{N * xi}{f * xd}\right) * d \quad \text{[Equation 3]}$$

In this manner, the segmented and scaled image of the local user C may be displayed on the transparent display screen of the remote user, so that the local user C appears to be physically at the remote location, at an actual size, with the physical surroundings of the remote location visible through the transparent display screen of the remote user. This will be discussed in more detail below with respect to FIGS. 5A-5D.

Figure 4:
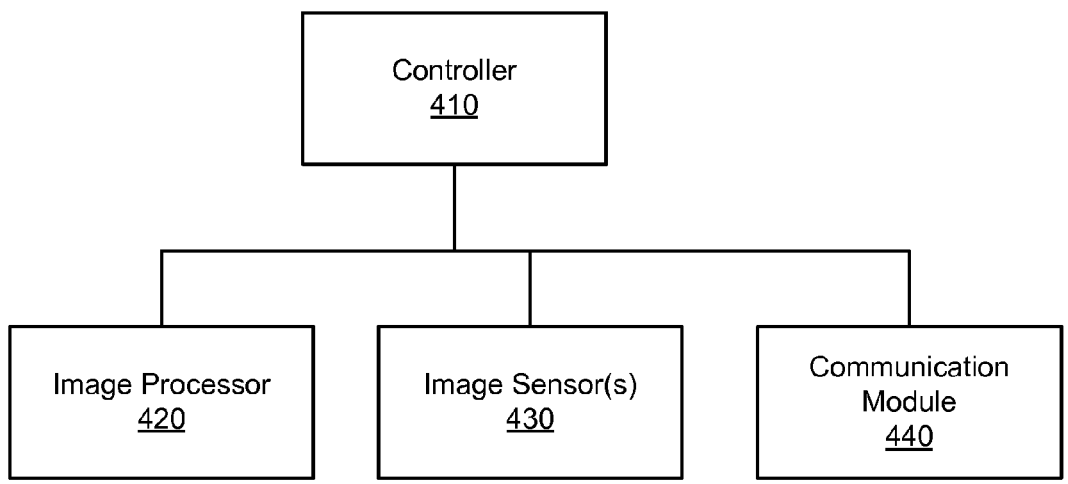
FIG. 4 is a block diagram of an example display of an immersive video teleconferencing system, in accordance with embodiments as broadly described herein.

FIG. 4 is a block diagram of a display having one or more image sensors operably coupled to the display, in an immersive teleconferencing system, in accordance with embodiments as broadly described herein. The display 400 may include a controller 410 controlling overall operation of the display 400. Images to be displayed on the display 400 for viewing by a local user may be processed and displayed by an image processor 420. One or more image sensors 430 may be operably coupled to the display 400 by the controller 410. In some embodiments, the image sensors 430 may be cameras that are separate from but physically coupled to the display 400 and operably coupled to the display 400 via the controller 410. In some embodiments, the image sensors 430 may be cameras that are integral to the display 400. In some embodiments, the image sensor 430 may be an image sensor, or a depth camera, operably coupled to the display 400 via the controller 410. The image sensor(s) 430 may capture images of the local user. The images captured by the image sensor(s) 430 may be processed by the image processor 420 and/or the controller 410, and transmitted to a remote user via a communication module 440 that allows for communication with external devices and/or networks. In some embodiments, the image processor 420 may process the images collected by the image sensor(s) 430 prior to transmission to the remote user. Processing by the image processor 420 may include, for example, extraction of depth data from the collected images, extraction of an image of the local user from the collected images based on the depth data, scaling of the extracted image of the local user based on the depth data, and the like. The communication module 440 may also receive signals from external devices and/or networks for execution by the controller 410.

Figure 5A:
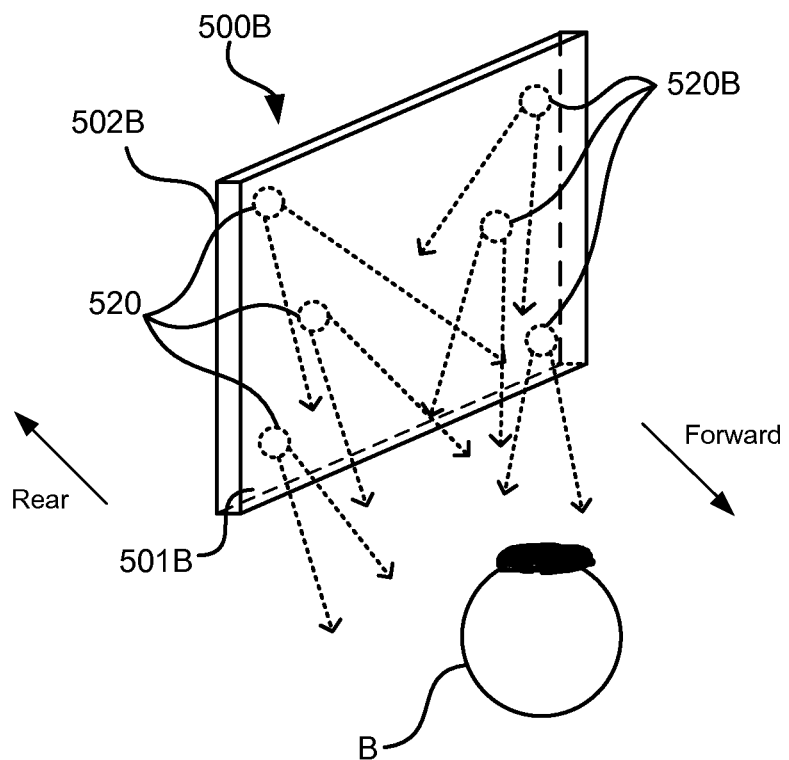
FIGS. 5A-5D illustrate a video teleconference of an immersive video teleconferencing system in progress, in accordance with embodiments as broadly described herein.
Figure 5B:
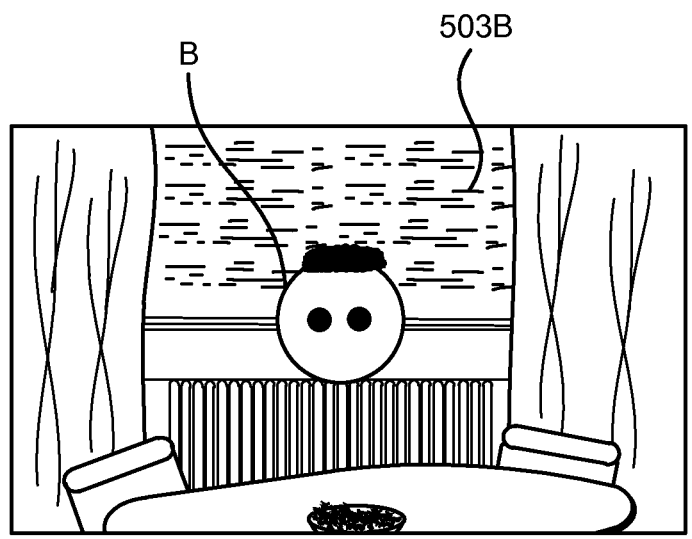
Figure 5C:
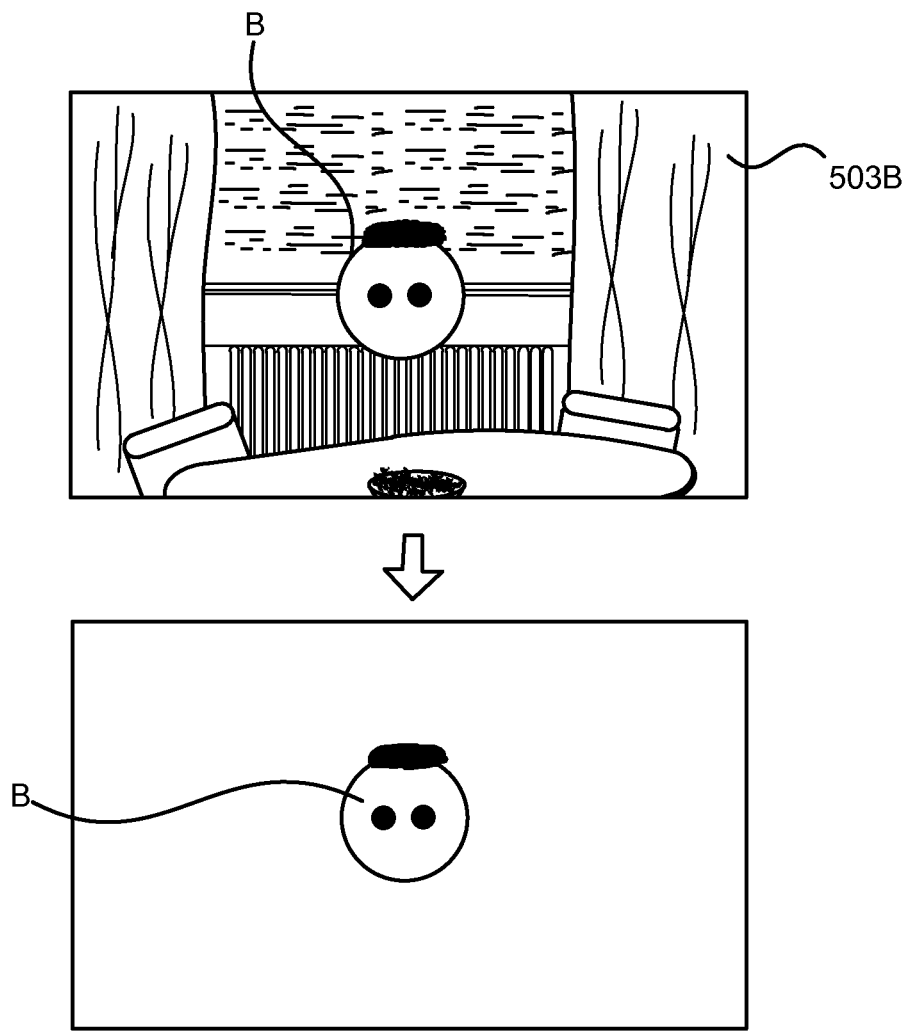
Figure 5D:
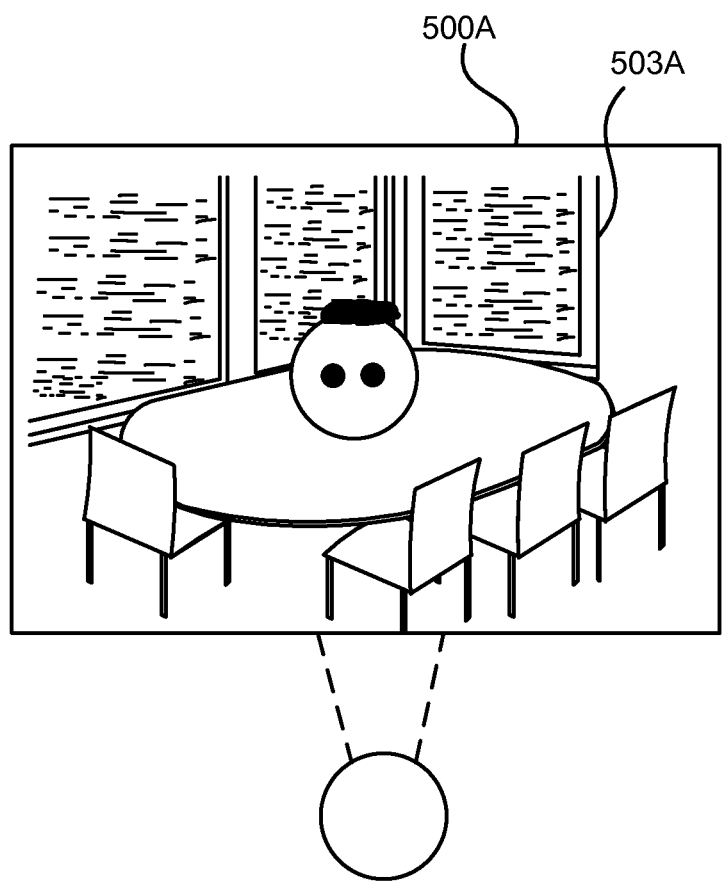

As shown in FIG. 5A, a plurality of image sensors 520B, or cameras, positioned on a rear surface 502B of a transparent display 500B and each having a field of view oriented toward the forward side of the transparent display 500B, and toward participant B, may capture an image of participant B at location B. The image(s) captured by the image sensors 520B may include participant B and the area surrounding participant B, or background 503B, at location B, as shown in FIG. 5B. A depth map may be extracted based on the images captured by the image sensors 520B, and the image of participant B may be extracted from the background 503B, as shown in FIG. 5C. With the background 503B removed and the image scaled, the video images may be transmitted to participant A's transparent display 500A at location A, as shown in FIG. 5D. The scaled image of participant B may be displayed on participant A's transparent display 500A, with the background 503A of location A visible through the transparent display 500A, so that participant B appears to be physically present at location A, providing a more realistically immersive experience for participant A.

The transparent display 500B and image sensors 520B shown in FIG. 5A are similar to the transparent display 300 and image sensors 320 shown in FIG. 3A, simply for ease of discussion and illustration. A similar process may be followed using, for example, the transparent display 300 and image sensors 320 shown in FIG. 3B, or the depth sensor 325 (and in some embodiments, the image sensor 320 in addition to the depth sensor 325, or an image sensor included in a depth camera capturing both image data and depth data) shown in FIG. 3C to extract the image of the local participant from the local background, scale the extracted image, and display the scaled image on the remote display of the remote participant, with the background of the remote location visible through the transparent display, as discussed above with respect to FIGS. 5A-5D.

Figure 6:
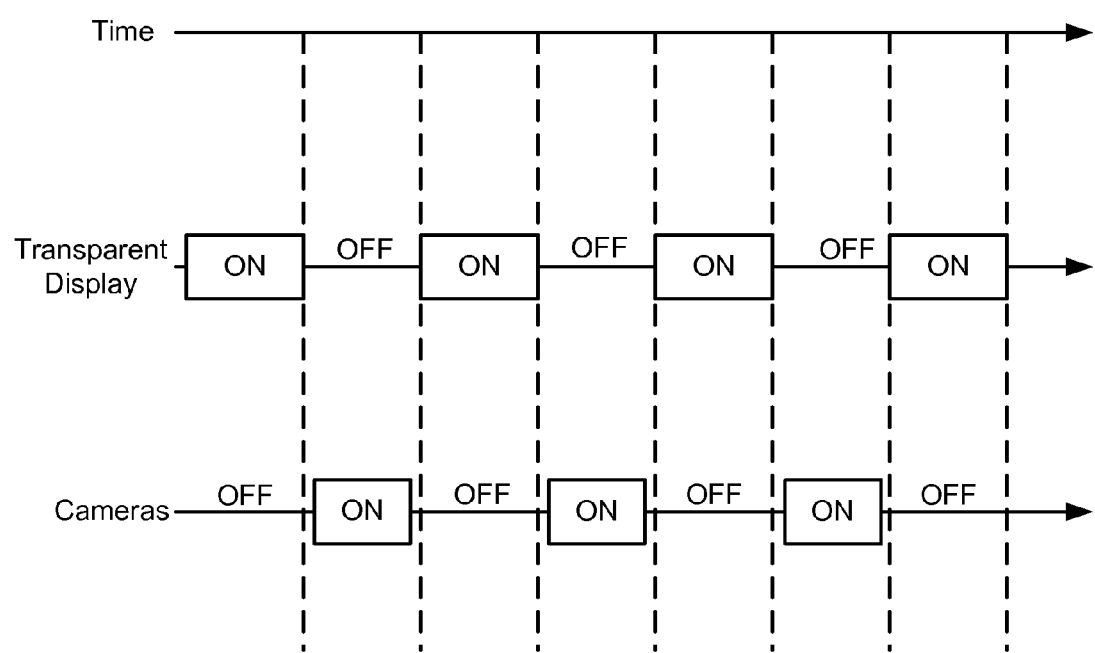
FIG. 6 is a timing diagram illustrating synchronization of a transparent display and one or more cameras operably coupled to the transparent display in an immersive teleconferencing system, in accordance with embodiments as broadly described herein.

When image sensors, or cameras, are positioned on the rear surface of the transparent display, as shown in, for example, FIG. 3A, an on/off cycle of the transparent display 300 may be synchronized with an on/off cycle of the image sensors 320 on the rear surface 302 of the transparent display 300. That is, while the transparent display 300 is in an OFF state, not displaying an image, and thus transparent, the image sensors 320 may be in an ON state, and able to capture images through the transparent display 300, as shown in the timing diagram of FIG. 6. In other words, the OFF state of the transparent display 300 may trigger the ON state of the image sensors 320, so that the timing of the ON state of the image sensors 320 is dependent on the timing of the OFF state of the transparent display 300, with one of the transparent display 300 or the image sensors 320 being OFF when the other of the transparent display 300 or the image sensors 320 is ON.

In particular, the transparent display 300 is not in a continuous ON state. Rather, the transparent display 300 alternates between the ON state and the OFF state. The resultant intermittent flickering generated by the alternating ON and OFF state of the display 300 is done at a rate which is imperceptible to the human eye. For example, in some embodiments, such a transparent display 300 may have a refresh rate of approximately 60 Hz, or 70 Hz, or other refresh rate. At these rapid refresh rates, the transparent display 300 appears to the local user C to be always in the ON state and always displaying images, when in reality the display 300 is in a transparent state during the intermittent OFF periods.

The image sensors 320 may be positioned on the rear surface 302 of the transparent display 300 such that a lens of the image sensors 320 is oriented to capture an image of the local user C and/or a local background area in the vicinity of the local user C. As the local user C is positioned facing a front surface 301, or viewing surface, of the transparent display 300, these images may be captured by the image sensors 320 through the transparent display 300 (through the rear surface 302 and front surface 301 of the display 300), when the transparent display 300 is in the OFF state in which images are not displayed and the display 300 is transparent so that the local user C is visible to the image sensors 320 through the display 300. During the ON periods of the transparent display 300, images are displayed for viewing by the local user C, and thus the display is opaque and a view of the local user C by the image sensors 320 is blocked by the images displayed on the display 300.

Accordingly, in some embodiments, the image sensors 320 may be operably coupled with the transparent display 300 via a controller that synchronizes the ON-OFF periods of the transparent display 300 with the OFF-ON periods of the cameras 320, or coordinates operation of the transparent display 300 and the images sensors 320 so that one of the transparent display 300 or the image sensors 320 is OFF while the other of the transparent display 300 or the image sensors 320 is ON. In some embodiments, for example, when the transparent display 300 switches from the ON state to the OFF state, the display 300, for example, the controller of the display 300, may send a signal to the image sensors 320 (such as, for example, cameras being operably coupled to the display 300) indicating that the display 300 has switched from the ON state to the OFF state. This signal may trigger the image sensors 320 to switch from the OFF state to the ON state and begin exposure, to capture images of the local user C and local background area. In some embodiments, the exposure time of the image sensors 320 may be less than or equal to the OFF period of the transparent display 300, so that the image sensors 320 may complete image capture before the transparent display 300 switches back to the ON state and the view of the image sensors 320 is blocked by opacity of the display 300 due to the images displayed on the display 300.

As discussed above, a depth map may be extracted based on images captured in this manner. The depth data may be used to extract the image of the local user C from the local background, and may be used to properly scale the image of the local user C, prior to transmitting the image to a display of a remote user at a remote location for viewing by the remote user.

Figure 7:
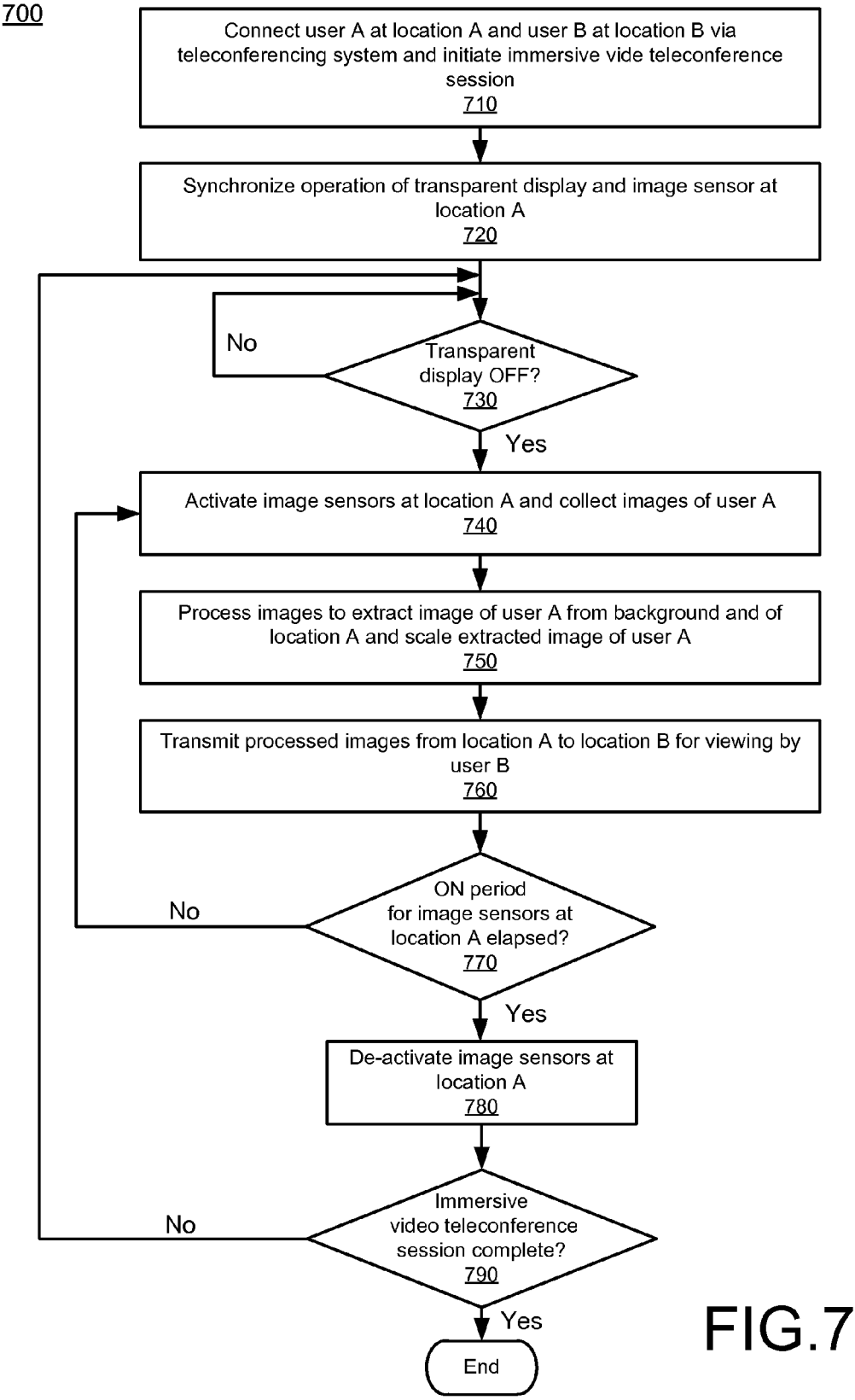
FIG. 7 is a flowchart of a method of displaying images in an immersive teleconferencing system, in accordance with embodiments as broadly described herein.

A method 700 of displaying images in an immersive teleconferencing system, in accordance with embodiments as broadly described herein, is shown in FIG. 7. First, at block 710, a user A at a location A is connected with a user B at a location B to initiate an immersive video teleconferencing session, and operation of a transparent display and image sensors operably coupled to the transparent display is synchronized at block 720. It is then determined, at block 730, if the transparent display is in an OFF state, based on the synchronized operation of the transparent display and the image sensors. If it is determined, at block 730, that the transparent display is in an OFF state, based on, for example, a signal transmitted from the transparent display to the image sensors, the image sensors at location A are activated to collect images of user A at location A. The OFF state of the transparent display indicates that the display is in a transparent state, and that the image sensors may capture images of the user A at location A through the transparent display.

The collected images are then processed, at block 750. This may include, for example, extracting depth data and/or a depth map based on the images collected by the image sensors, and then using the depth data and/or depth map to extract an image of user A from a background of location A so that only the image of user A remains, and then scaling the image of user A based on the depth data and/or depth map, so that the image of user A may be transmitted to location B, at block 760, and displayed at properly scaled size on a display at location B for viewing by user B.

When it is determined, at block 770, that an ON period for the image sensors at location A has elapsed, the image sensors at location A may be de-activated at block 780. In some embodiments, the ON period for the image sensors may be less than or equal to a known OFF period for the transparent display, so that images may be fully captured and stored for processing during the OFF period of the transparent display. This process may be repeated until it is determined, at block 790, that the immersive video teleconferencing session has been completed.

The process illustrated in FIG. 7 is presented from the perspective of image collecting, processing and transmission at location A, simply for ease of discussion and illustration. A similar process may be performed at location B, to collect, process and transmit images from location B to location A for viewing by the user A at location A.

Figure 8:
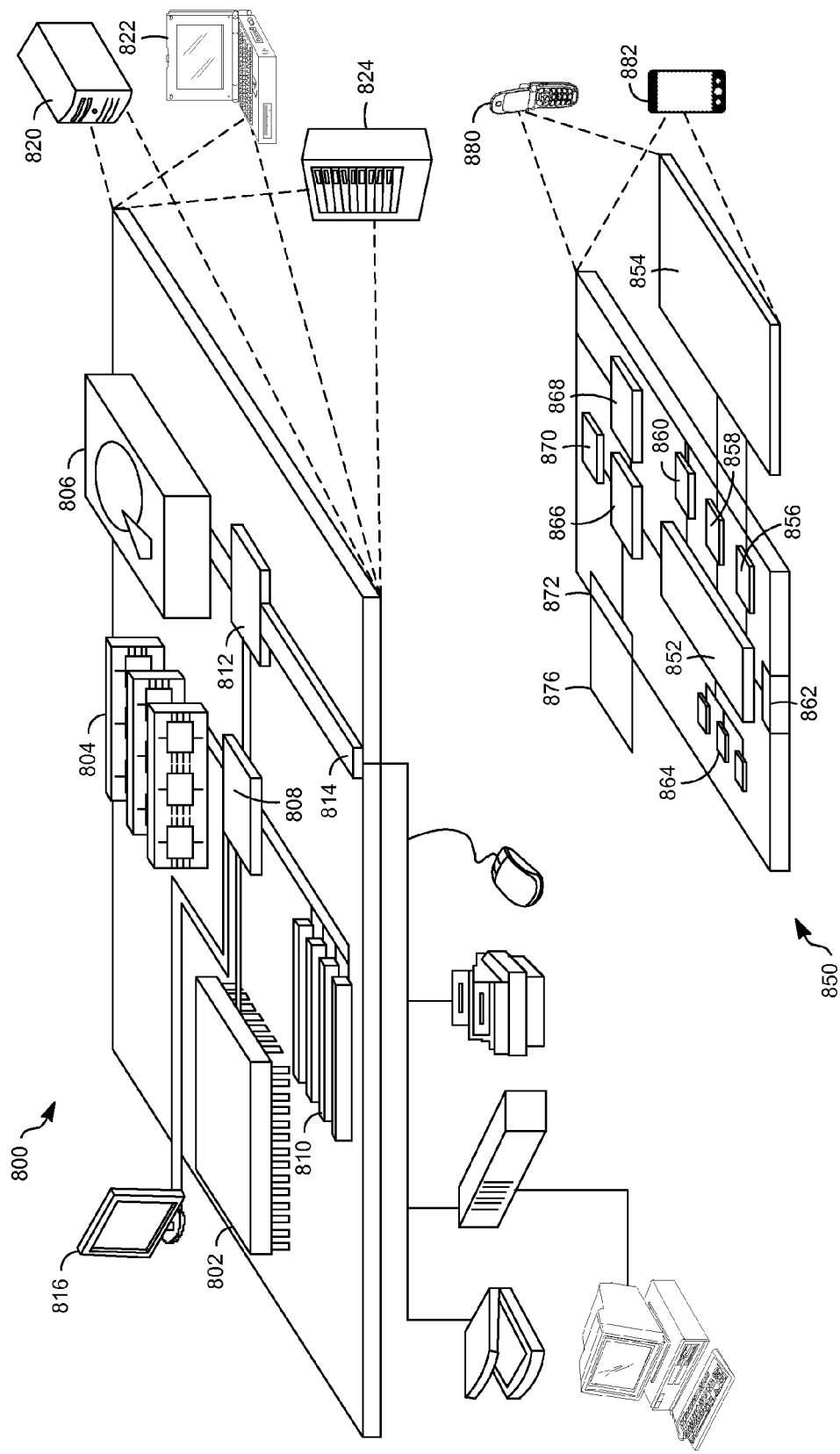
FIG. 8 shows an example of a computer device and a mobile computer device that can be used to implement the techniques described here

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   establishing a connection between a first video teleconferencing device at a first location and a second video teleconferencing device at a second location to initiate a video teleconferencing session, the second location being different from the first location;

synchronizing operation of a first display at the first location and at least one first image sensor at the first location, the at least one first image sensor being operably coupled to the first display;

capturing images at the first location using the at least one first image sensor;

generating a scaled image of a subject at the first location based on the images captured at the first location by the at least one first image sensor, including:

extracting an image of the subject from a background of the images captured by the at least one first image sensor based on a depth map generated from the images captured by the at least one first image sensor; and scaling the extracted image of the subject, including:

mapping a size of the subject, detected based on depth data from the depth map, to a size of the image of the subject at a plane of the at least one first image sensor, corresponding to a first number of pixels each having a first pixel size; and scaling the image for display on a second display of the second video teleconferencing device at the second location, including mapping the first number of pixels each having the first pixel size to a second number of pixels each having a second pixel size at the second display; and transmitting the generated scaled image of the subject at the first location to the second video teleconferencing device at the second location for display on the second display, the second display being transparent such that the generated scaled image of the subject at the first location being displayed on the transparent second display such that a background of the second location behind the transparent second display is visible through the transparent second display, the background of the second location being visible surrounding the scaled image of the subject displayed on the transparent second display.

2. The method of claim 1, wherein the first display is a transparent display, and wherein synchronizing operation of the transparent first display at the first location and at least one first image sensor at the first location includes:

triggering operation of the at least one first image sensor so that the at least one first image sensor is in an ON state when the transparent first display is in an OFF state, and the at least one first image sensor is in an OFF state when the transparent first display is in an ON state.

3. The method of claim 1, wherein the first display is a transparent display, and wherein capturing images at the first location using the at least one first image sensor includes capturing images including the subject positioned to a first side of the first display using a plurality of cameras on a second side of the first display.

4. The method of claim 3, wherein capturing images including the subject positioned to a first side of the transparent first display using a plurality of cameras on a second side of the transparent first display includes:

switching the plurality of cameras to an ON state when the transparent first display is in an OFF state and capturing images of the predetermined subject through the transparent first display; and switching the plurality of cameras to an OFF state when the transparent first display is in an ON state.

5. The method of claim 4, wherein synchronizing operation of the transparent first display at the first location and at least one first image sensor at the first location includes:

setting an ON period for the plurality of cameras to correspond to an OFF period for the transparent first display, and setting an OFF period for the plurality of cameras to correspond to an ON period for the transparent first display; and setting a duration of the ON period for the plurality of cameras to be less than or equal to the OFF period of the transparent first display.

6. The method of claim 1, wherein capturing images at the first location using the at least one first image sensor includes capturing images including the subject at the first location using a depth camera operably coupled to the first display.

7. The method of claim 1, further comprising repeating the capturing, generating and transmitting until the video teleconferencing session is completed.

8. A method, comprising:

synchronizing operation of a first transparent display at a first location and at least one first image sensor at the first location, the at least one first image sensor being operably coupled to the first transparent display;

capturing images at the first location using the at least one first image sensor, the captured images including a subject located at the first location;

generating depth data from the images captured by the at least one first image sensor;

extracting an image of the subject from a background of the images captured by the at least one first image sensor based on the generated depth data;

scaling the extracted image of the subject based on the generated depth data, including:

detecting a size of the subject based on depth data mapping the size of the subject to a size of the image of the subject at a plane of the at least one first image sensor, corresponding to a first number of pixels each having a first pixel size; and mapping the first number of pixels each having the first pixel size to a second number of pixels each having a second pixel size at a second transparent display;

transmitting the extracted scaled image of the subject at the first location to the second transparent display at a second location; and displaying the scaled image of the subject on the second transparent display at the second location, with an area of the second location at a rear side of the second transparent display being visible through the second transparent display from a forward side of the second transparent display, the area of the second location being visible at portions of the second transparent display surrounding the displayed scaled image of the subject.

9. The method of claim 8, wherein capturing images at the first location using the at least one first image sensor includes activating a plurality of cameras on a rear side of the first transparent display, a field of view of each of the plurality of cameras being oriented through the first transparent display to a portion of the first location positioned at a front side of the first transparent display, and capturing images of the first location including the subject through the first transparent display.

10. The method of claim 9, wherein synchronizing operation of a first transparent display at a first location and at least one first image sensor at the first location includes:

setting an ON period for the plurality of cameras to correspond to an OFF period for the first transparent display, and setting an OFF period for the plurality of cameras to correspond to an ON period for the first transparent display; and setting a duration of each ON period for the plurality of cameras to be less than or equal to a corresponding OFF period of the first transparent display.

11. The method of claim 8, wherein the at least one first image sensor is a depth camera operably coupled to the first transparent display.

12. An immersive video teleconferencing apparatus, comprising:
    a transparent display;
    at least one image sensor; and
    a controller operably coupling the at least one image sensor to the transparent display, the controller being configured to:
        receive images captured by the at least one image sensor;
        generate depth data from the images captured by the at least one image sensor;
        extract a subject from a background of the captured images based on the generated depth data;
        scale the image of the extracted subject based on the generated depth data, including:
            map a size of the subject, detected based on the depth data, to a size of the image of the subject at a plane of the at least one first image sensor, corresponding to a first number of pixels each having a first pixel size; and
            map the first number of pixels each having the first pixel size to a second number of pixels each having a second pixel size at a remote transparent display; and
        transmit the image of the scaled extracted subject to the remote transparent display at a remote location,
        wherein a background area of the remote location behind the remote transparent display is visible through the remote transparent display, the background area being visible surrounding the image of the scaled subject displayed on the remote transparent display.

13. The apparatus of claim 12, wherein the at least one image sensor includes a depth camera operably coupled to the transparent display and configured to capture depth data related to the subject.

14. The apparatus of claim 12, wherein the transparent display includes a front surface facing the subject and a rear surface opposite the front surface, and wherein the at least one image sensor includes a plurality of cameras on the rear surface of the transparent display.

15. The apparatus of claim 14, wherein a field of view of each of the plurality of cameras is oriented through the transparent display toward the subject, the plurality of cameras being configured to capture images including the subject through the transparent display.

16. The apparatus of claim 14, wherein the controller is configured to synchronize operation of the transparent display and operation of the plurality of cameras, the plurality of cameras being in an ON state when the transparent display is in an OFF state, and the plurality of cameras being in an OFF state when the transparent display is in an ON state.

17. The apparatus of claim 16, wherein a duration of each ON period of the plurality of cameras is less than or equal to a duration of a corresponding OFF period of the transparent display.

* * * * *

UNITED STATES PATENT AND TRADEMARK OFFICE
CERTIFICATE OF CORRECTION

PATENT NO. : 9,699,405 B2  
APPLICATION NO. : 14/798766  
DATED : July 4, 2017  
INVENTOR(S) : Wan et al.

Page 1 of 1

It is certified that error appears in the above-identified patent and that said Letters Patent is hereby corrected as shown below:

In the Claims

In Column 16, Line 33, Claim 8, delete "data" and insert -- data; --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*